(12) United States Patent
Westphal et al.

(10) Patent No.: US 8,475,756 B1
(45) Date of Patent: Jul. 2, 2013

(54) METHOD FOR THE PRODUCTION OF URANIUM CHLORIDE SALT

(75) Inventors: Brian R. Westphal, Idaho Falls, ID (US); Robert D. Mariani, Idaho Falls, ID (US)

(73) Assignee: U.S. Department of Energy, Washington, DC (US)

( * ) Notice: Subject to any disclaimer, the term of this patent is extended or adjusted under 35 U.S.C. 154(b) by 298 days.

(21) Appl. No.: 13/082,844

(22) Filed: Apr. 8, 2011

(51) Int. Cl.
*C01G 43/08* (2006.01)

(52) U.S. Cl.
USPC .................................. 423/257; 423/3; 423/19

(58) Field of Classification Search
USPC ........................................ 423/3, 19, 257, 491
See application file for complete search history.

(56) References Cited

U.S. PATENT DOCUMENTS

| | | | | |
|---|---|---|---|---|
| 2,864,666 A | * | 12/1958 | Calkins | 423/257 |
| 3,982,928 A | * | 9/1976 | Chiotti et al. | 75/399 |
| 5,322,545 A | * | 6/1994 | Gilchrist | 75/399 |
| 5,454,914 A | * | 10/1995 | Gay | 205/44 |
| 6,689,260 B1 | * | 2/2004 | Ahluwalia et al. | 204/247.2 |
| 6,800,262 B1 | | 10/2004 | Miller et al. | |
| 7,011,736 B1 | * | 3/2006 | Miller et al. | 205/47 |
| 7,217,402 B1 | | 5/2007 | Miller et al. | |

* cited by examiner

*Primary Examiner* — Ngoc-Yen Nguyen
(74) *Attorney, Agent, or Firm* — Brian J. Lally; Michael J. Dobbs; John T. Lucas

(57) ABSTRACT

A method for the production of $UCl_3$ salt without the use of hazardous chemicals or multiple apparatuses for synthesis and purification is provided. Uranium metal is combined in a reaction vessel with a metal chloride and a eutectic salt- and heated to a first temperature under vacuum conditions to promote reaction of the uranium metal with the metal chloride for the production of a $UCl_3$ salt. After the reaction has run substantially to completion, the furnace is heated to a second temperature under vacuum conditions. The second temperature is sufficiently high to selectively vaporize the chloride salts and distill them into a condenser region.

23 Claims, 1 Drawing Sheet

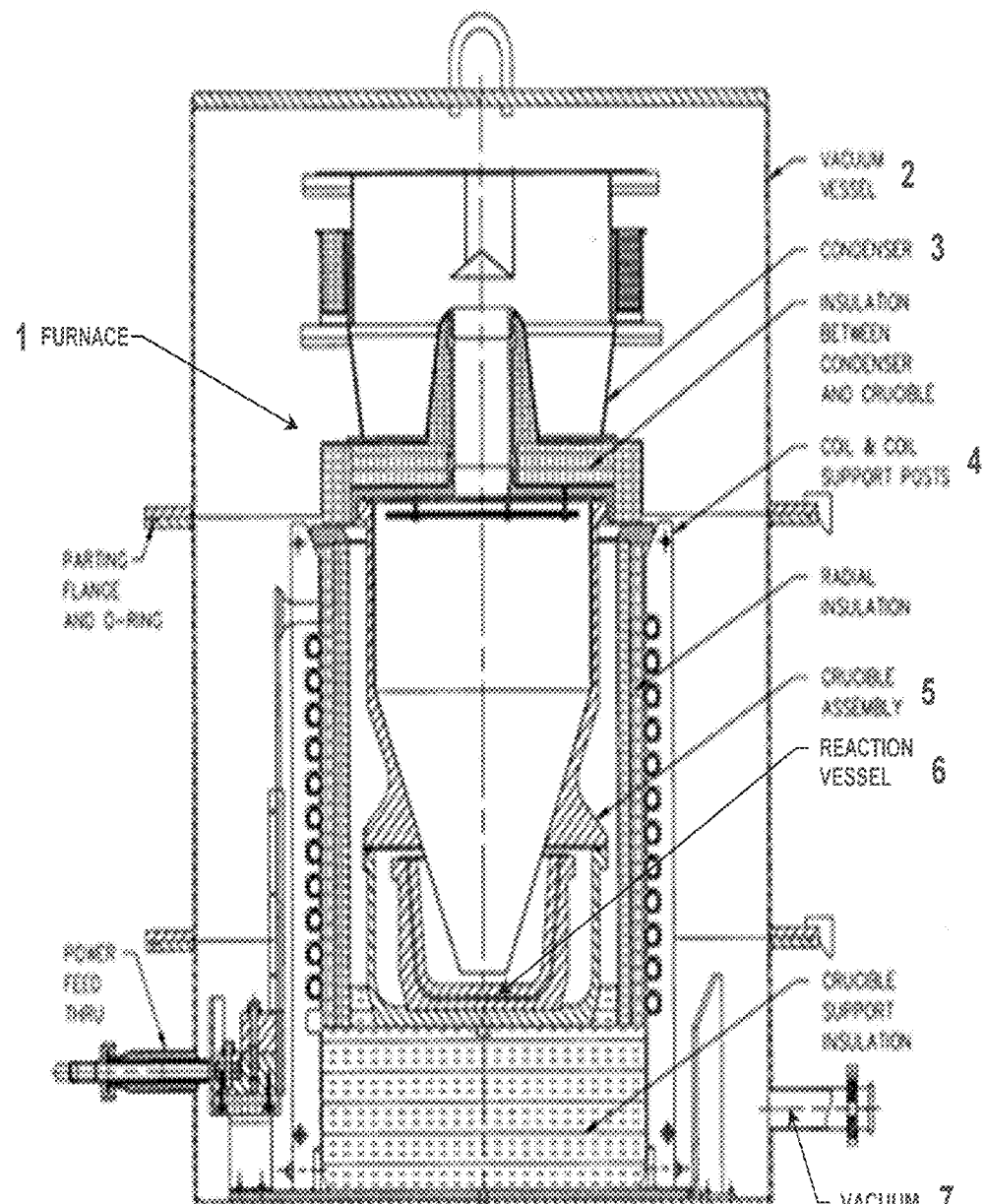

METHOD FOR THE PRODUCTION OF URANIUM CHLORIDE SALT

GOVERNMENT INTERESTS

The United States Government has rights in this invention pursuant to Contract No. DE-AC07-051D14517, between the U.S. Department of Energy (DOE) and Battelle Energy Alliance LLC, representing Idaho National Laboratory.

FIELD OF THE INVENTION

Methods consistent with the present disclosure relate to producing uranium chloride salt by reacting uranium metal with a metal chloride in the presence of a eutectic salt and, more specifically, to a method of producing uranium chloride from spent nuclear fuel.

BACKGROUND

The accumulation of sodium-bonded spent nuclear fuel poses a substantial environmental threat that has led to the development of a variety of treatment procedures. One such treatment applies an electrometallurgical process to recover low-enriched uranium and convert radioactive fission products into acceptable waste forms. This treatment utilizes uranium chloride as an oxidizing agent to convert sodium, actinides, and fission products into their corresponding chloride salts.

A supply of uranium chloride is therefore necessary for the continued electrometallurgical treatment of sodium-bonded spent nuclear fuel. However, existing methods of production do not satisfy this requirement because of their reliance upon special equipment, hazardous chemicals, and subsequent purification steps. For example, U.S. Pat. No. 6,800,262, issued to Miller and Tomczuk, discloses a method for making uranium chloride salt in a cadmium system using cadmium chloride to oxidize uranium. However, implementation of that method requires special handling and disposal procedures because of its use of cadmium, which is a regulated metal. Moreover, it requires additional equipment and involves the handling of chlorine gas, which poses additional risk. Thus, a method to produce uranium chloride of sufficient purity without hazardous chemicals or additional equipment would be beneficial.

SUMMARY

One or more embodiments of the present invention are directed to a method to produce uranium chloride that satisfies the need for uranium chloride without the use of hazardous chemicals and multiple apparatuses for synthesis and purification. A method to produce uranium chloride having features of the present invention includes the steps of: (a) mixing uranium metal and a metal chloride with a eutectic salt in a reaction vessel; (b) heating the reaction vessel to a first hold temperature above the melting point of the metal chloride; (c) maintaining the first hold temperature at a first pressure for a time period sufficient to react the uranium metal and metal chloride, wherein the first hold pressure is less than atmospheric pressure; (d) heating the reaction vessel to a second hold temperature above the melting point of the uranium metal; and (e) maintaining the second hold temperature at a second hold pressure for a period sufficient to distill the uranium chloride salt and allow metal consolidation.

One or more embodiments of the present invention improve upon the existing methods for production of uranium chloride by eliminating the use of hazardous chemicals. Instead, the various embodiments of Applicants' method produce uranium chloride by reacting uranium metal with a non-hazardous metal chloride in the presence of a eutectic salt, such as LiCl—KCl. Following formation, uranium chloride dissolves into the eutectic salt, and the metal alloys with excess uranium.

Applicants also improve upon the requirement for additional machinery by conducting the reaction and purification in a single apparatus capable of heating a reaction vessel under vacuum conditions and distilling chloride salts into a condenser region as described herein. Prior to heating the reaction vessel, the uranium metal, metal chloride, and eutectic salt are mixed, which can be accomplished mechanically. Subsequently, the reaction vessel is heated to a first hold temperature that exceeds the melting temperature of the metal chloride to carry out the reaction between uranium metal and metal chloride. To prevent the spurious vaporization of $UCl_4$, the first hold pressure may exceed the vapor pressure of $UCl_4$.

One or more embodiments of the present method also obviate the requirement for additional purification by including a step to distill uranium chloride from excess metals. Following the reaction of uranium metal with metal chloride, the reaction vessel is heated to a second hold temperature above the melting temperature of uranium metal under vacuum conditions sufficient to selectively vaporize the chloride salts. The chloride salts migrate in the vapor phase to a condenser region.

In another embodiment of the present invention, an electrorefiner cathode product comprising uranium and a eutectic salt is mixed with a metal chloride. The production and collection of uranium chloride otherwise follows the method described above.

In another embodiment of the present invention, an electrorefiner cathode product of about 20 wt. % LiCl—KCl eutectic salt and about 80 wt. % uranium is mixed in a reaction vessel with $CuCl_2$ in a ratio of between about 25 to 1 and 20 to 1, respectively. The reaction vessel is heated to a first hold temperature of about 650° C. under a first hold pressure, preferably at less than atmospheric pressure (about 760 Torr), and even more preferably in the range of about 100-760 Torr. After maintaining the first hold temperature and pressure for a period of about two hours, the reaction vessel is heated to a second hold temperature of about at least 1200° C., and the pressure is decreased to a second hold pressure, preferably between about 0.1-10 Torr. The second hold temperature and pressure are maintained for a period of time sufficient to distill the chloride salts into a condenser region and consolidate the uranium metal product in the reaction vessel.

These and other features, aspects, and advantages of the multiple embodiments of the present invention will become better understood with reference to the following drawings, description, appended claims, and by practice of the invention.

DESCRIPTION OF THE DRAWINGS

One embodiment of the present invention is illustrated in the accompanying FIGURE where:

FIG. 1 is a diagram of an induction-heated furnace compatible with one or more embodiments of the present invention.

DETAILED DESCRIPTION

Generally, the present invention is directed to a method to produce uranium chloride and includes the steps of: (a) mixing uranium metal and a metal chloride with a eutectic salt in a reaction vessel; (b) heating the reaction vessel to a first hold temperature above the melting point of the metal chloride; (c) maintaining the first hold temperature at a first pressure for a period sufficient to react the uranium metal and metal chloride, wherein the first hold pressure is less than atmospheric pressure; (d) heating the reaction vessel to a second hold temperature above the melting point of the uranium metal; and (e) maintaining the second hold temperature at a second hold pressure for a period sufficient to distill the uranium chloride salt and allow metal consolidation.

In the first step of one or more embodiments, uranium metal, metal chloride, and a eutectic salt are mixed in a reaction vessel. To assure thorough mixing, mechanical means, such as agitation with blades or baffles, are preferably utilized to mix the uranium metal, metal chloride and eutectic salt prior to loading the reaction vessel into a furnace capable of distilling chloride salts, such as an induction-heated furnace or a resistance heated furnace. Alternatively, the uranium metal, metal chloride, and eutectic salt may be mixed in a reaction vessel that is already contained in a furnace or other heating means.

The uranium metal is preferably natural or depleted uranium. Applicants envision various structures of uranium, including rods, sheets, disks, ingots, pellets, slugs, plates, foils, and powders/particulates/fines. Uranium sheets provide an advantage over alternative structures because they typically possess a greater reaction surface area. The eutectic salt is preferably a mixture of LiCl—KCl, having a melting temperature of about 360° C. Metal chlorides are utilized as a source of chloride to form uranium chloride. The preferred metal chloride for this method is non-hazardous, such as $CuCl_2$, $MnCl_2$, and $ZrCl_4$, and is added to uranium metal in a ratio corresponding to reaction (1).

$$U + (3/x)MCl_x \rightarrow UCl_3 + (3/x)M \quad (1)$$

In an alternative embodiment, uranium metal and eutectic salt are added to a reaction vessel in the form of an electrorefiner cathode product, comprising about 20 wt. % eutectic salt and about 80 wt. % uranium metal. In this embodiment, the eutectic salt consists of LiCl—KCl with minor amounts of fission product chlorides and sodium chloride.

The reaction vessel has a structural integrity sufficient to house uranium metal and is preferably constructed of a solid graphite mold. In one embodiment, the graphite mold is coated with zirconia to promote release of the uranium metal product from the mold. Alternative reaction vessel coatings envisioned by Applicants include but are not limited to hafnia, erbia, and alumina coatings. In yet another embodiment, Applicants envision lining the reaction vessel with copper metal foil to prevent interaction between the uranium and zirconia.

In the next step, the reaction vessel is heated to a first hold temperature after being loaded into an induction-heated furnace or other heating means. The temperature within the furnace is raised to a first hold temperature that exceeds the melting point of the metal chloride under vacuum conditions. The temperature in the furnace may be increased at various rates, but is preferably increased at a rate of less than 10° C. per minute. Preferably, the first hold temperature is about 30° C. above the melting temperature of the metal chloride. Even more preferably, the first hold temperature is such that it prevents salt distillation at the first hold pressure. For example, at a pressure of about 1 Torr, the upper range of the first hold temperature is preferably less than 750° C. in order to prevent salt distillation. In additional embodiments, a first hold temperature of about 650° C. is preferable for $CuCl_2$, where the melting temperature for $CuCl_2$ is about 620° C. Similarly, a first hold temperature of about 680° C. is appropriate for $MnCl_2$, and a first hold temperature of about 450° C. is appropriate for $ZrCl_4$.

The first hold temperature is maintained under vacuum conditions for a period of time sufficient for the metal chloride and uranium metal to react, according to reaction (1). In one embodiment, the first hold temperature and pressure are held constant for a period of about at least 2 hours. To maintain vacuum conditions throughout the reaction, a vacuum system is operably connected to the furnace. In one embodiment, internal pressure in the reaction vessel is preferably in the range of about 100-760 Torr. In another embodiment, the internal pressure of the reaction vessel is between about 0.1-1 Torr. However, any pressure below atmospheric pressure may be compatible with the multiple embodiments of the present invention depending on other operating conditions.

In the next step, the furnace is heated to a second hold temperature above the melting temperature of uranium metal (1132° C.) under vacuum conditions to distill the chloride salts and consolidate the uranium metal product. In one preferred embodiment, the temperature is raised to about 1200° C., under vacuum conditions in the preferred range of about 0.1-10 Torr. In another preferred embodiment, the temperature is raised above about 1200° C., preferably under similar vacuum conditions. The temperature and pressure are maintained for a period of time sufficient for the chloride salts to distill from the uranium metal product. As with the first heating step, a large range of pressures below atmospheric pressure are compatible with the process depending on other operating conditions.

In one embodiment, the second hold temperature is maintained under vacuum conditions for a period of about 2 hours, but any period of time sufficient to distill the chloride salts is acceptable. The distillation is performed under differential vacuum conditions to direct the migration of chloride salts to a specific region of the furnace for collection, generally referred to as a condenser region herein. Upon completion, the chloride salts are then returned to an electrorefiner where the uranium chloride acts as an oxidant to incoming sodium, actinides, and fission product metals.

In addition to formation of $UCl_3$, reaction of metal chloride with uranium, as set forth in reaction (1), will also produce $UCl_4$, as shown in reaction (2). As depicted in reaction (3), $UCl_4$ may decompose into $UCl_3$. However, this decomposition is precluded where the first hold pressure is below the vapor pressure of $UCl_4$, allowing $UCl_4$ to spontaneously vaporize into the condensate. To avoid the spurious distillation of $UCl_4$, the first hold pressure should exceed the vapor pressure of $UCl_4$ for a time sufficient for reaction (3) to run substantially to completion. To this end, a first hold pressure is preferably maintained between about 100 and 760 Torr for about two hours.

$$2CuCl_2 + U \rightarrow UCl_4(g) + 2Cu \quad (2)$$

$$3UCl_4 + U \rightarrow 4UCl_3 \quad (3)$$

FIG. 1 depicts one embodiment of a furnace 1 for the production of $UCl_3$ compatible with one or more embodiments of the present invention. A reaction vessel 6 houses the uranium metal, metal chloride, and eutectic salt for the chlorination process. In a preferred embodiment, the reaction vessel 6 is a graphite mold with a zirconia coating that prevents contact of the process materials with the graphite. After the process materials are mixed, the reaction vessel 6 is loaded into a crucible assembly 5. A passively cooled induction coil 4 surrounds the crucible assembly 5 and through radiation heats the reaction vessel 6 to a first hold temperature.

A condenser region 3 is located on top of the crucible assembly 5. Following the chlorination process, the reaction vessel 6 is heated to a second hold temperature and distillate materials migrate in the vapor phase from the reaction vessel 6 to the condenser region 3, where the chloride salt products are recovered. To maintain vacuum conditions throughout the chlorination and distillation process, a vacuum system 7 connects to the condenser region 3 of the furnace 1, which is housed within an argon-atmosphere vacuum vessel 2.

While the above description relates to production of uranium chloride salt in a specific furnace, it is apparent to one or ordinary skill in the art that the multiple embodiments of the present invention can be performed in a number of different reaction environments, and the previously described apparatus in no way limits the manner in which the multiple embodiments of the invention can be performed.

EXAMPLE 1

A reaction vessel coated with zirconia and lined with copper metal foil was loaded with 2790 g of LiCl—KCl eutectic salt, 5048 g of cupric chloride, and 10,288 g of uranium rods. The uranium rods were approximately 1.9 cm in diameter and 21.1 cm in length, having an effective surface area of 0.12 $cm^2/g$. After loading the reaction components, the pressure within the reaction vessel was lowered to about 25 Torr, and then the temperature was increased to about 650° C. The temperature and pressure were maintained for about 2 hours. Subsequently, the pressure was decreased to about 13 Torr, and the temperature was raised to about 1350° C. These conditions persisted for about 5 hours to distill the chloride salt products.

Following distillation, chemical analysis of the condensate was performed in duplicate, as represented in Table 1. Eight metals were detected in the condensate, and assuming the chloride species of each of the metals, both samples had a mass balance of about 90%. Based on the amount of copper found in the condensate, the reaction was found to have not run to completion. This was attributed to the low surface area of the uranium rods. The presence of aluminum and zirconium in the condensate was attributed to side reactions of $UCl_3$ with the alumina liner and zirconia coating of the reaction vessel, and the iron was attributed to $UCl_3$ reacting with the stainless components of the condenser. The sodium was residual from previous metal waste operations. Additionally, the vacuum pressure of 13 Torr was found insufficient for complete distillation of the chloride salts. In a subsequent run, the internal pressure was lowered to 2 Torr and an additional 282 g of salt was distilled.

TABLE 1

| Chemical Analysis of Condensate (values in wt. %) | | | | | | | |
|---|---|---|---|---|---|---|---|
| Sample | U | Cu | Li | K | Al | Zr | Fe | Na |
| #1 | 10.7 | 3.8 | 6.4 | 8.1 | 2.2 | 0.6 | 0.5 | <0.4 |
| #2 | 10.6 | 6.2 | 4.6 | 9.6 | 1.9 | 1.8 | 0.5 | 1.8 |

EXAMPLE 2

A reaction vessel without alumina, coated with zirconia, and lined with copper metal foil was loaded with 2778 g of LiCl—KCl eutectic salt, 5042 g of $CuCl_2$, and 10,602 g of uranium sheet pieces. The uranium sheet pieces were approximately 25.4 mm×25.4 mm×0.8 mm and had an effective surface area of 1.46 $cm^2/g$. After mixing the process materials, the reaction vessel was heated to about 650° C. for about three hours under vacuum conditions of about 2 Torr. The reaction vessel was then heated to about 1240° C. for about two hours under vacuum conditions of about 2 Torr to distill the chloride salt products.

Following distillation, chemical analysis of the condensate was performed in duplicate, as represented in Table 2. Assuming the chloride species of each of the metals, both samples had a mass balance of about 91%. The higher quantity of uranium in the condensate, relative to the previous run, was attributed to the increased surface area of the uranium metal. The analysis showed a slight contamination of the salt species by copper, aluminum, zirconium, and iron. The copper was attributed to vaporized $CuCl_2$ and fuming of copper metal, which has a vapor pressure of 0.01 Torr at 1240° C. The other metals were attributed to side reactions found in the previous run, mitigated by the removal of alumina from the reaction vessel ring. The sodium was a vestige of earlier metal waste operations. Additionally, the condensate had a green color, indicating the spurious distillation of $UCl_4$.

TABLE 2

| Chemical Analysis of Condensate (values in wt. %) | | | | | | | |
|---|---|---|---|---|---|---|---|
| Sample | U | Cu | Li | K | Al | Zr | Fe | Na |
| #1 | 44.3 | 1.3 | 1.4 | 7.1 | 0.6 | 0.7 | 0.1 | <0.02 |
| #2 | 40.6 | 3.8 | 0.8 | 7.2 | 0.5 | 0.1 | 0.1 | <0.01 |

EXAMPLE 3

In this run, 42,686 g of electrorefiner product and 1763 g of $CuCl_2$ were mechanically mixed and then loaded into a graphite mold reaction vessel coated with zirconia. The electrorefiner product was about 80% uranium metal and about 20% eutectic salt. After loading the reaction vessel into a furnace, the reaction vessel was heated to a first hold temperature of about 650° C. for 1 hour under a vacuum of less than about 1 Torr. Following the 1 hour hold, the temperature was increased to about 1200° C., and the pressure was maintained at less than about 1 Torr for about 30 minutes.

Following distillation, copper content in the condensate and metal product was measured in triplicate. The condensate was homogenized prior to sampling by heating to 500° C. for 5 hours and samples were taken of the solidified condensate ingot by drilling shavings from the ingot. The copper content in the condensate was not detectable by ICP-OES having a detection limit of 200 ppm, indicating that the reaction ran to completion.

The metal product was sampled by melting the uranium and taking a sample from the molten mass by injection casting. Each of the metal product samples had a copper content of about 2.54 wt %. For a complete reaction of uranium metal and $CuCl_2$ in the presence of a salt fraction of 19.6 wt. %, 2.51 wt. % copper in the metal product was predicted. Taking into account experimental error, the ratio of the expected and measured values ("E/M") of copper content in the condensate was 0.99, indicating complete reaction of $CuCl_2$ and uranium metal.

EXAMPLE 4

In this example, 1002 g of $MnCl_2$ and 15,913 g of uranium metal disks and sheets were combined in a reaction vessel along with LiCl—KCl eutectic salt. The reaction vessel was subsequently loaded into a furnace. The operating pressure in the reaction vessel was decreased to about 100 Torr to prevent the premature distillation of $MnCl_2$. Following the decrease in pressure, the temperature was increased to about 650° C. Both temperature and pressure were maintained for about 5 hours to allow Reaction (1) to proceed to completion. Following the reaction period, the furnace was heated to a maximum temperature above 1132° C. to distill the chloride salt products.

Following distillation the amount of manganese in the condensate was analyzed using ICP-AES. From this analysis, it was determined that the condensate contained a negligible amount of manganese (6700 ppm), indicating that Reaction (1) went substantially to completion.

EXAMPLE 5

1494 g of $CuCl_2$ was added to a reaction vessel along with 41,428 g of dendritic uranium. LiCl—KCl eutectic salt was present in the dendritic uranium metal. The reaction vessel was then loaded into a furnace. The pressure within the furnace was lowered below 5 Torr, and then the temperature was increased to about 650° C. The temperature and pressure were maintained for about 1 hour. Following reaction of uranium with the metal chloride, the temperature in the furnace was raised to about 1200° C., and the pressure was lowered below about 1 Torr. The temperature and pressure were held constant for about 30 minutes.

The condensate and the metal fraction were measured after distillation to examine the progress of Reaction (1). Using ICP-AES, the copper content in the metal fraction was measured and compared with the estimated value that assumes a complete reaction between uranium and $CuCl_2$. The measured quantity of copper was 1.57 wt. % while the estimated value was 1.75 wt. %. Accordingly, the E/M value was 1.11, indicating that the reaction substantially completed. To further investigate the progress of the reaction, the amount of copper in the condensate was measured using ICP-AES. Less than 190 ppm copper was detected. This negligible amount of copper corroborated the conclusion that the reaction ran essentially to completion.

EXAMPLE 6

1560 g of $CuCl_2$ was combined with 14,393 g of dedritic uranium metal in a reaction vessel, along with LiCl—KCl eutectic salt present in the dendritic uranium metal. The reaction vessel was then loaded into a furnace. Following loading of the reactants, the pressure in the reaction vessel was lowered below 5 Torr. The temperature in the reaction vessel was then increased to about 1200° C. and the pressure was lowered below 1 Torr. These conditions were maintained for 30 minutes to distill the chloride salt products into a condenser region, Following distillation, the condensate was analyzed using ICP-AES to determine the quantity of copper in the condensate. Analysis identified 283 ppm copper in the condensate. This negligible quantity of copper indicated that the reaction ran substantially to completion.

EXAMPLE 7

To prevent side reactions between the reactants and the reaction vessel, copper metal was added to the vessel as a liner. 4263 g of $CuCl_2$ was added to the lined reaction vessel along with 11,886 g of dendritic uranium metal, containing LiCl—KCl eutectic salt. The vessel was then loaded into a furnace. Following loading, the pressure in the reaction vessel was lowered below 1 Torr, and the temperature was increased to about 650° C. The temperature and pressure were maintained for about 2 hours to allow for the completion of reaction (1). Following the reaction period, the pressure was maintained below 1 Torr, and the temperature was raised to about 1200° C. These operating conditions were held constant for about 30 minutes to distill the chloride salt products.

After distillation, the metal product, including the copper liner, was analyzed using ICP-AES to determine the amount of copper. The measured amount of copper was 52.13 wt. %, and the estimated amount of copper, assuming complete reaction of metal chloride and uranium metal, was 52.88 wt. %. The E/M value approached unity at 1.01, indicating that the reaction ran to completion.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

We claim:

1. A method for the preparation of uranium chloride salt comprising:
    (a) mixing uranium metal and a metal chloride with a eutectic salt in a reaction vessel;
    (b) heating the reaction vessel to a first hold temperature above the melting point of the metal chloride;
    (c) maintaining the first hold temperature at a first hold pressure for a period sufficient to react the uranium metal and metal chloride, wherein the first hold pressure is less than atmospheric pressure;
    (d) heating the reaction vessel to a second hold temperature above the melting point of the uranium metal; and
    (e) maintaining the second hold temperature at a second hold pressure for a period sufficient to distill the uranium chloride salt and allow metal consolidation.

2. A method according to claim 1, wherein the first hold temperature is maintained for at least 2 hours.

3. A method according to claim 1, wherein the metal chloride is selected from the group consisting of $CuCl_2$, $MnCl_2$, $ZrCl_4$ and combinations thereof.

4. A method according to claim 1, wherein the uranium metal and metal chloride are mechanically mixed prior to heating to the first hold temperature.

5. A method according to claim 1, wherein the eutectic salt is LiCl—KCl.

6. A method according to claim 1, wherein the metal chloride is $CuCl_2$ and the first hold temperature is about 650° C.

7. A method according to claim 1, wherein the metal chloride is $MnCl_2$ and the first hold temperature is about 680° C.

8. A method according to claim 1, wherein the metal chloride is $ZrCl_4$, and the first hold temperature is about 450° C.

9. A method according to claim 1, wherein the first hold temperature is reached by increasing the temperature of the reaction vessel at a rate of less than about 10° C. per minute and at less than ambient pressure.

10. A method according to claim 1, wherein the first hold pressure is between about 100 and 760 Torr.

11. A method according to claim 1, wherein the second hold temperature is at least about 1200° C.

12. A method according to claim 1, wherein the second hold pressure is between about 0.1 and 10 Torr.

13. A method according to claim 1, wherein the metal chloride is $CuCl_2$ and the eutectic salt is LiCl—KCl, wherein the first hold temperature is about 650° C. and is maintained for about 2 hours under vacuum conditions of between about 100 and 760 Torr, and further wherein the second hold temperature is about 1200° C. and maintained for a period of about 2 hours under vacuum conditions of less than 10 Torr.

14. A method for the preparation of uranium chloride comprising:
(a) mixing an electrorefiner cathode product and a metal chloride in a reaction vessel, wherein the electrorefiner cathode product comprises uranium and a eutectic salt;
(b) heating the reaction vessel to a first hold temperature at less than atmospheric pressure and maintaining the first hold temperature for a time period sufficient to react the uranium and metal chloride, wherein the first hold temperature is greater than the melting temperature of the metal chloride;
(c) heating the reaction vessel to a second hold temperature above the melting temperature of the uranium metal and decreasing the pressure in the reaction vessel to a second hold pressure;
(d) maintaining the second hold temperature and the second hold pressure for a period sufficient to distill the uranium chloride salt into a receiver vessel.

15. A method according to claim 14, wherein the metal chloride is selected from the group consisting of $MnCl_2$, $CuCl_2$, $ZrCl_4$, and combinations thereof.

16. A method according to claim 14, wherein the metal chloride is $CuCl_2$, and the first hold temperature is about 650° C.

17. A method according to claim 14, wherein the electrorefiner cathode product comprises about 20 wt. % eutectic salt and about 80 wt. % uranium.

18. A method according to claim 14, wherein the ratio of cathode product to metal chloride is between about 25 to 1 and 20 to 1.

19. A method according to claim 14, wherein the first hold pressure is less than about 100 Torr.

20. A method according to claim 14, wherein the first hold pressure is between about 100 and 760 Torr.

21. A method according to claim 14, wherein the second hold temperature is at least about 1200° C.

22. A method according to claim 14, wherein the second hold pressure is between about 0.1 and 10 Torr.

23. A method for preparing uranium chloride salt, comprising:
(a) mixing an electrorefiner cathode product with $CuCl_2$ in a reaction vessel, wherein the cathode product comprises uranium and LiCl—KCl eutectic salt;
(b) heating the reaction vessel to a first hold temperature of about 650° C.;
(c) maintaining the first hold temperature at a first hold pressure for a period of about 2 hours, wherein the first hold pressure is between about 100 and 760 Torr; and
(d) additionally heating the reaction vessel to a second hold temperature of about 1200° C. and decreasing the pressure to a second hold pressure less than 10 Torr for a period of time sufficient to distill a uranium chloride salt product.

* * * * *